United States Patent
Wu

(10) Patent No.: US 10,901,889 B2
(45) Date of Patent: Jan. 26, 2021

(54) USING HYBRID-SOFTWARE/HARDWARE BASED LOGICAL-TO-PHYSICAL ADDRESS MAPPING TO IMPROVE THE DATA WRITE THROUGHPUT OF SOLID-STATE DATA STORAGE DEVICES

(71) Applicant: ScaleFlux, Inc., San Jose, CA (US)

(72) Inventor: Qi Wu, San Jose, CA (US)

(73) Assignee: SCALEFLUX, INC., San Jose, CA (US)

(*) Notice: Subject to any disclaimer, the term of this patent is extended or adjusted under 35 U.S.C. 154(b) by 0 days.

(21) Appl. No.: 16/521,711

(22) Filed: Jul. 25, 2019

(65) Prior Publication Data

US 2020/0034286 A1 Jan. 30, 2020

Related U.S. Application Data

(60) Provisional application No. 62/703,260, filed on Jul. 25, 2018.

(51) Int. Cl.
*G06F 13/00* (2006.01)
*G06F 12/02* (2006.01)
*G06F 3/06* (2006.01)
*G06F 12/1009* (2016.01)
*G06F 12/0802* (2016.01)

(52) U.S. Cl.
CPC ........ *G06F 12/0246* (2013.01); *G06F 3/0656* (2013.01); *G06F 3/0679* (2013.01); *G06F 12/0802* (2013.01); *G06F 12/1009* (2013.01); *G06F 3/0607* (2013.01)

(58) Field of Classification Search
CPC .............. G06F 12/0246; G06F 3/0656; G06F 12/1009; G06F 3/0679; G06F 12/0802; G06F 3/0607; G06F 3/0613
See application file for complete search history.

(56) References Cited

U.S. PATENT DOCUMENTS

| | | | | |
|---|---|---|---|---|
| 6,711,663 B2* | 3/2004 | Lai | ...... | G06F 12/0246 711/103 |
| 8,443,167 B1* | 5/2013 | Fallone | ...... | G06F 12/0246 711/206 |
| 10,445,231 B2* | 10/2019 | Zhou | ...... | G06F 11/00 |
| 2008/0195801 A1* | 8/2008 | Cheon | ...... | G06F 12/0246 711/103 |
| 2010/0023676 A1* | 1/2010 | Moon | ...... | G06F 12/0246 711/103 |
| 2011/0131231 A1* | 6/2011 | Haas | ...... | G06F 12/0246 707/769 |

(Continued)

*Primary Examiner* — Jing-Yih Shyu
(74) *Attorney, Agent, or Firm* — Hoffman Warnick LLC

(57) ABSTRACT

A method for providing logical block address (LBA) to physical block address (PBA) binding in a storage device includes: receiving at least one thread at a hardware engine of the device controller of the storage device, each thread including data and LBAs for the data; writing the data into a write buffer of the storage device; binding, by the hardware engine of the device controller, a sequence of contiguous PBAs for a section of the memory to the LBAs for the data in the write buffer; determining if the write buffer contains enough data for the section of the memory; and if the write buffer contains enough data for the section of the memory, writing the data to the section of the memory.

19 Claims, 7 Drawing Sheets

(56) References Cited

U.S. PATENT DOCUMENTS

| | | | |
|---|---|---|---|
| 2013/0124794 A1* | 5/2013 | Bux | G06F 12/0246 |
| | | | 711/103 |
| 2018/0024919 A1* | 1/2018 | Geml | G06F 12/0246 |
| | | | 711/103 |
| 2018/0113631 A1* | 4/2018 | Zhang | G06F 3/0679 |
| 2018/0356998 A1* | 12/2018 | Wu | G06F 12/0246 |
| 2019/0250841 A1* | 8/2019 | Li | G06F 3/0643 |

* cited by examiner

USING HYBRID-SOFTWARE/HARDWARE BASED LOGICAL-TO-PHYSICAL ADDRESS MAPPING TO IMPROVE THE DATA WRITE THROUGHPUT OF SOLID-STATE DATA STORAGE DEVICES

TECHNICAL FIELD

The present disclosure relates to the field of solid-state data storage, and more particularly to improving the write throughput performance of solid-state data storage devices.

BACKGROUND

Solid-state data storage devices, which use non-volatile NAND flash memory technology, are being pervasively deployed in various computing and storage systems. In addition to including one or multiple NAND flash memory chips, each solid-state data storage device also contains a controller that manages all the NAND flash memory chips.

NAND flash memory cells are organized in an array-→block→page hierarchy, where one NAND flash memory array is partitioned into a large number (e.g., thousands) of blocks, and each block contains a number (e.g., hundreds) of pages. Data are programmed and fetched in the unit of a page. The size of each flash memory page typically ranges from 8 kB to 32 kB, and the size of each flash memory block is typically tens of MBs. Flash memory cells must be erased before being re-programmed, and the erase operation is carried out in the unit of a block (i.e., all the pages within the same block must be erased at the same time). As a result, NAND flash memory cannot support the convenient inplace data update.

Because NAND flash memory lacks an update-in-place feature, solid-state data storage devices must use indirect address mapping. Internally, solid-state data storage devices manage data storage on NAND flash memory chips in the unit of a constant-size (e.g., 4 kB) physical sector. Each physical sector is assigned a unique physical block address (PBA). Instead of directly exposing the PBAs to external hosts, solid-state data storage devices expose an array of logical block addresses (LBA) and internally manage/maintain an injective mapping between LBA and PBA. The software component responsible for managing the LBA-PBA mapping is called the flash translation layer (FTL).

In conventional practice, LBA-PBA binding is handled solely by FTL software, and the controller hardware strictly follows the LBA-PBA bindings that are determined by the FTL software for all incoming write requests. Nevertheless, such a software-based LBA-PBA binding approach can make it very difficult to fully exploit the NAND flash memory write bandwidth, especially when storage devices use multiple threads to handle and process write requests.

SUMMARY

Accordingly, embodiments of the present disclosure are directed to methods for improving the performance and the write throughput performance of solid-state data storage devices.

A first aspect of the disclosure is directed to a method for providing logical block address (LBA) to physical block address (PBA) binding in a storage device, the method including: receiving at least one thread at a hardware engine of the device controller of the storage device, each thread including data and LBAs for the data; writing the data into a write buffer of the storage device; binding, by the hardware engine of the device controller, a sequence of contiguous PBAs for a section of the memory to the LBAs for the data in the write buffer; determining if the write buffer contains enough data for the section of the memory; and if the write buffer contains enough data for the section of the memory, writing the data to the section of the memory.

A second aspect of the disclosure is directed to a storage device, including: memory; a write buffer; and a device controller, the device controller including a hardware engine, wherein the hardware engine of the device controller is configured to: receive at least one thread, each thread including data and logical block addresses (LBAs) for the data; write the data into the write buffer of the storage device; bind a sequence of contiguous physical block addresses (PBAs) for a section of the memory to the LBAs for the data in the write buffer; determine if the write buffer contains enough data for the section of the memory; and if the write buffer contains enough data for the section of the memory, write the data to the section of the memory.

A third aspect of the disclosure is directed to a method for binding logical block addresses (LBAs) to physical block addresses (PBAs) in a storage device, including: receiving at least one thread at a device controller hardware engine of the storage device, each thread including data and LBAs for the data; writing the data into a write buffer of the storage device; binding, by the device controller hardware engine, a sequence of contiguous PBAs for a section of the memory to the LBAs for the data in the write buffer; determining if the write buffer contains enough data for the section of the memory; and if the write buffer contains enough data for the section of the memory, writing the data to the section of the memory.

BRIEF DESCRIPTION OF THE DRAWINGS

The numerous advantages of the present disclosure may be better understood by those skilled in the art by reference to the accompanying figures.

The drawings are intended to depict only typical aspects of the disclosure, and therefore should not be considered as limiting the scope of the disclosure. In the drawings, like numbering represents like elements between the drawings.

DETAILED DESCRIPTION

Reference will now be made in detail to embodiments of the disclosure, examples of which are illustrated in the accompanying drawings.

Figure 1:
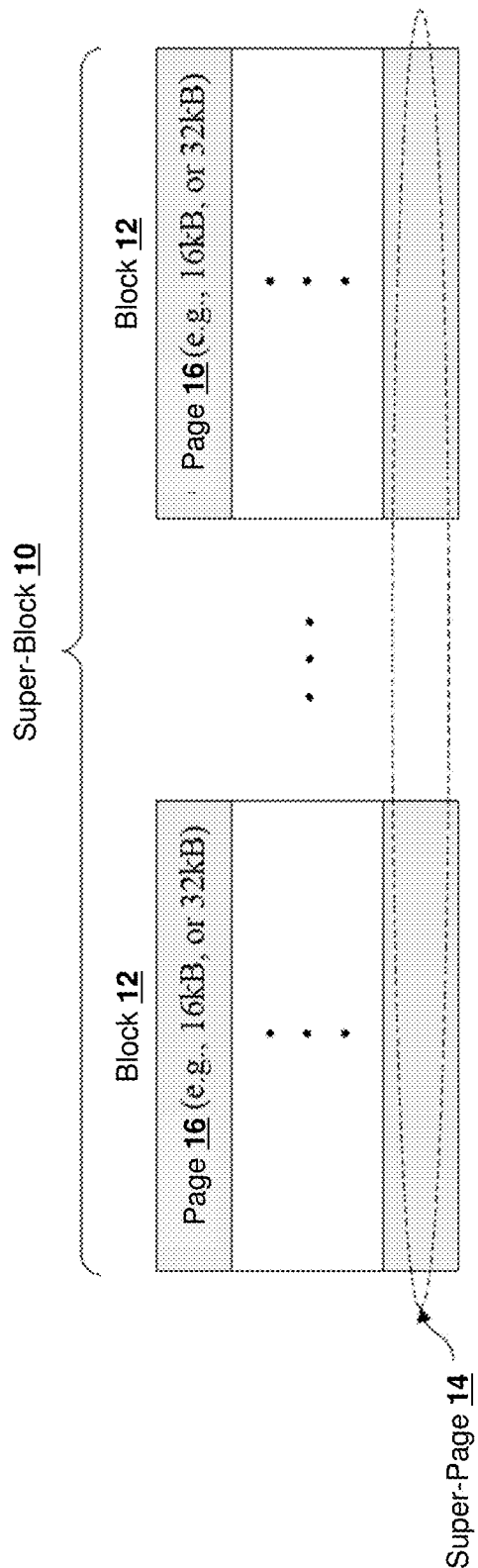
FIG. 1 illustrates the structure of a super-block and a super-page in solid-state data storage devices.

In order to simplify flash memory management, modern solid-state data storage devices partition the entire NAND flash memory storage space into super-blocks 10, and each super-block 10 contains multiple NAND flash memory blocks 12, as illustrated in FIG. 1. All of the flash memory blocks 12 in each super-block 10 are erased at the same time. Each super-block 10 further contains a number of super-pages 14, where each super-page 14 contains multiple flash memory pages 16 across all the flash memory blocks 12 inside one super-block 10. Data are programmed into NAND flash memory chips in the unit of super-pages 14. The size of each flash memory page 16 is typically 16 kB or 32 kB. Hence, if a super-block 10 contain s flash memory blocks 12, each super-page 14 contains 16s kB or 32s kB.

Figure 2:
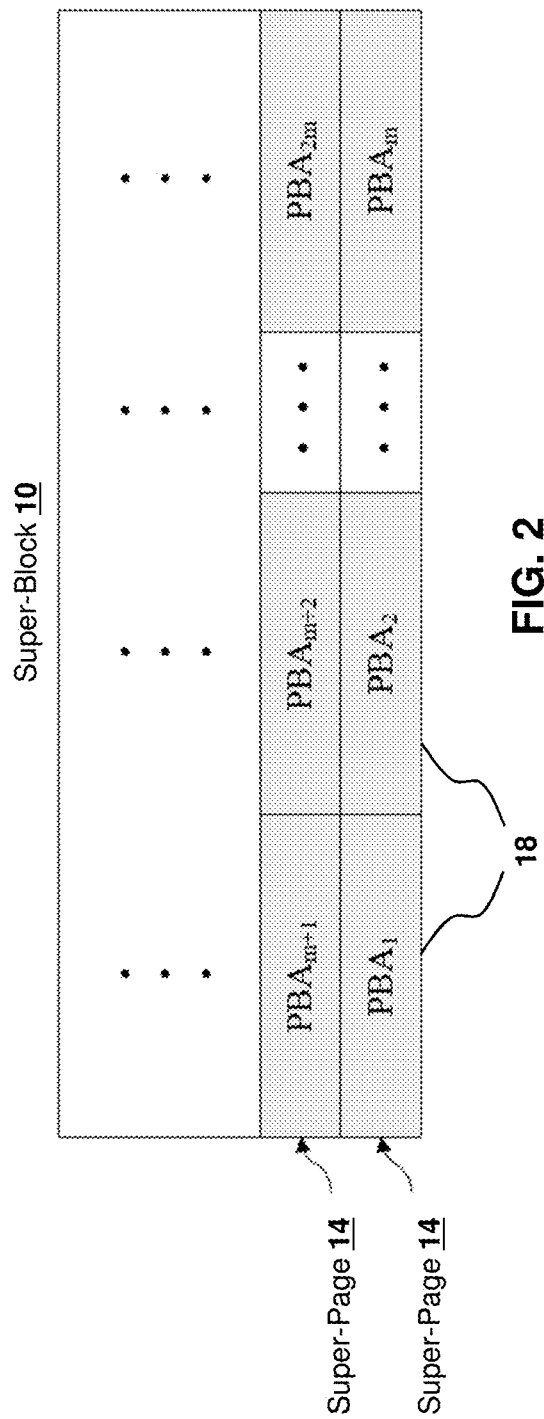
FIG. 2 illustrates contiguous PBAs within super-pages and super-blocks.

Solid-state data storage devices must internally buffer and accumulate the content of one complete super-page 14 before writing the super-page 14 to flash memory. Solid-state data storage devices logically partition NAND flash memory storage space into size-n physical sectors, where n denotes the data I/O sector size (e.g., 512 B or 4 kB). Each physical sector is assigned a unique physical block address (PBA). As shown in FIG. 2, each super-page 14 contains a number of PBAs 18, and the PBAs 18 within each super-page 14 are always contiguous, as illustrated in FIG. 2, where $PBA_1, PBA_2, \ldots, PBA_m, PBA_{m+1}, PBA_{m+2}, \ldots$ are contiguous PBAs 18. In addition, because all of the pages 16 within each flash memory block 12 must be programmed sequentially with a fixed order, the PBAs 18 within each super-block 10 are also contiguous from one super-page 14 to the next super-page 14.

Figure 3:
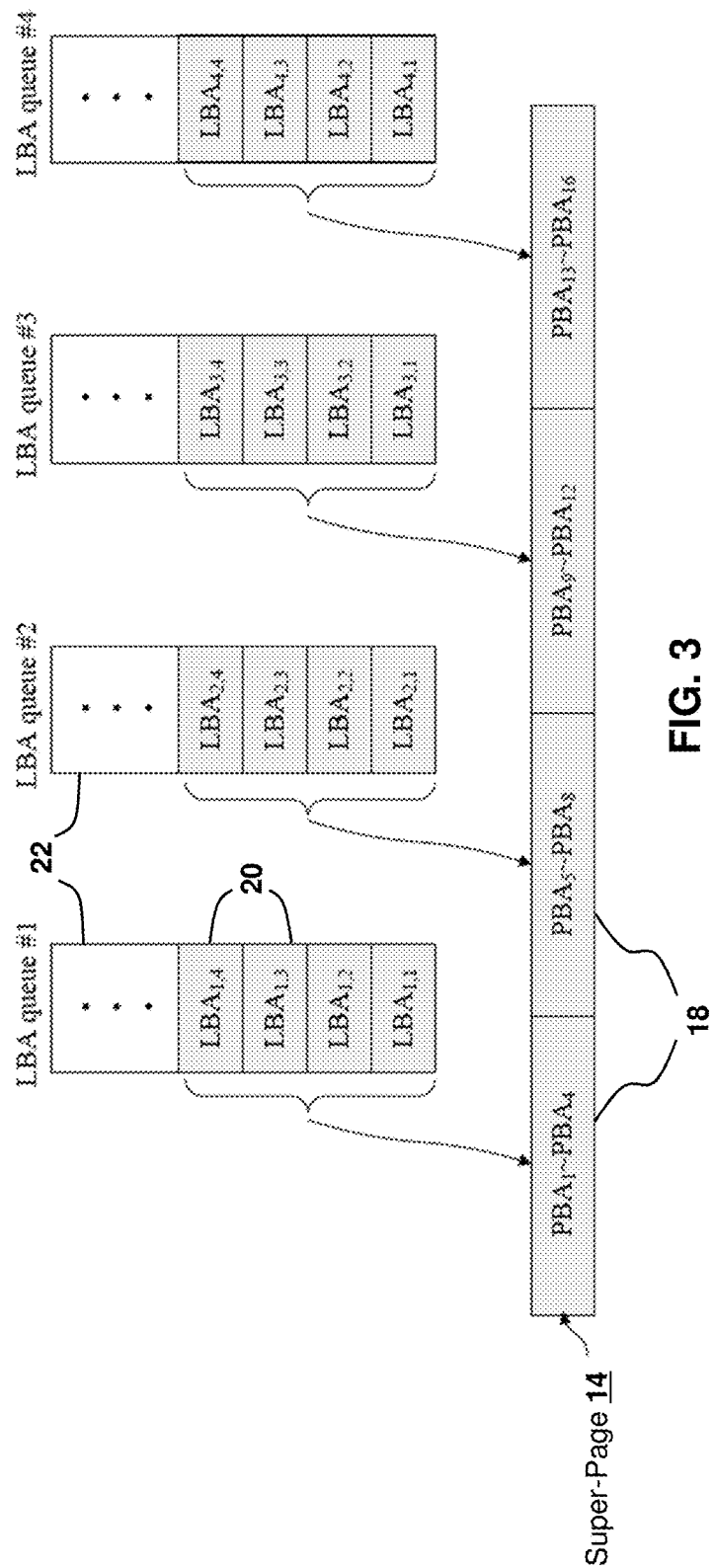
FIG. 3 illustrates software-based LBA-PBA binding.
Figure 4:
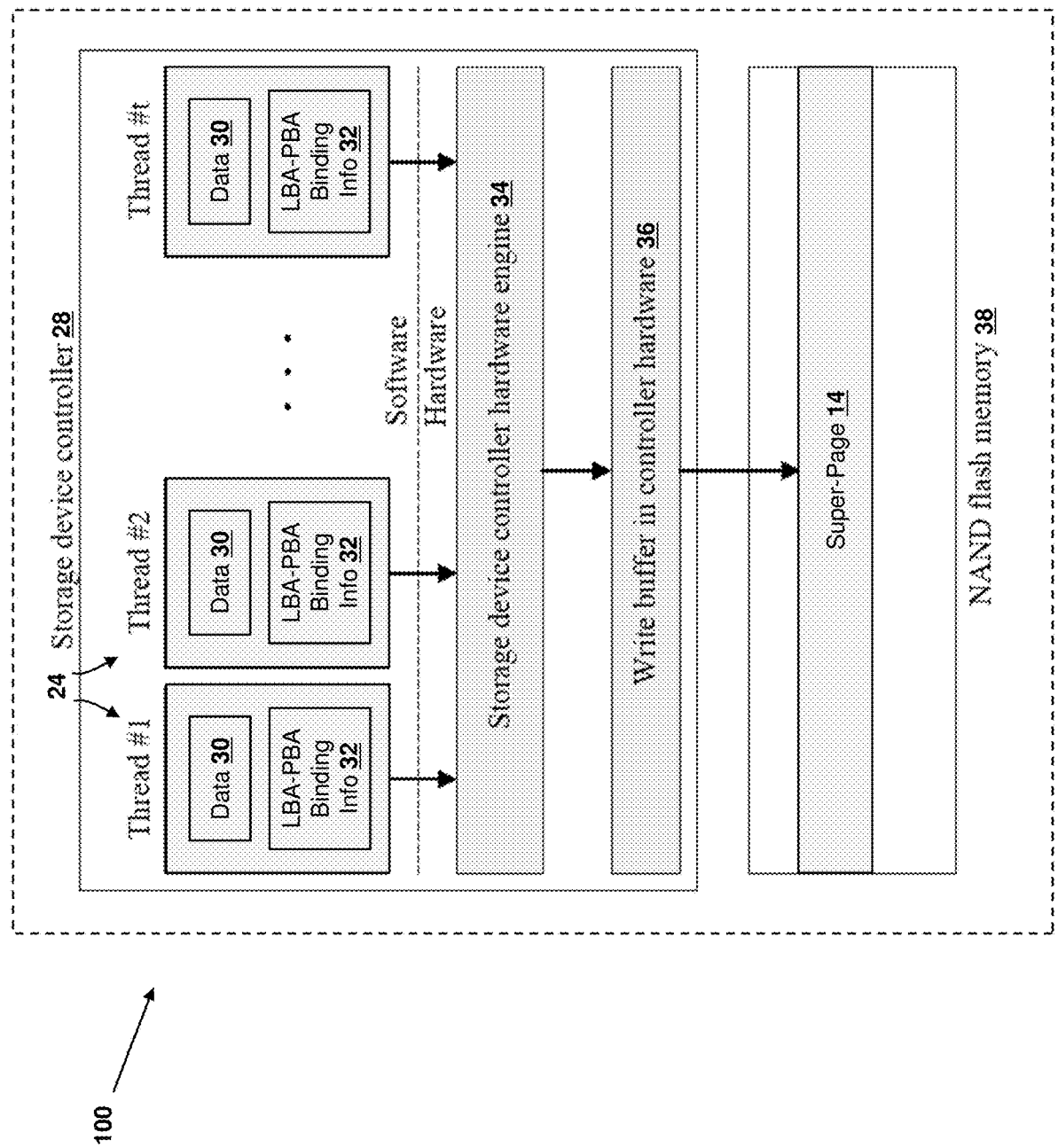
FIG. 4 illustrates a storage device controller of a solid-state data storage device using software-based LBA-PBA binding.
Figure 5:
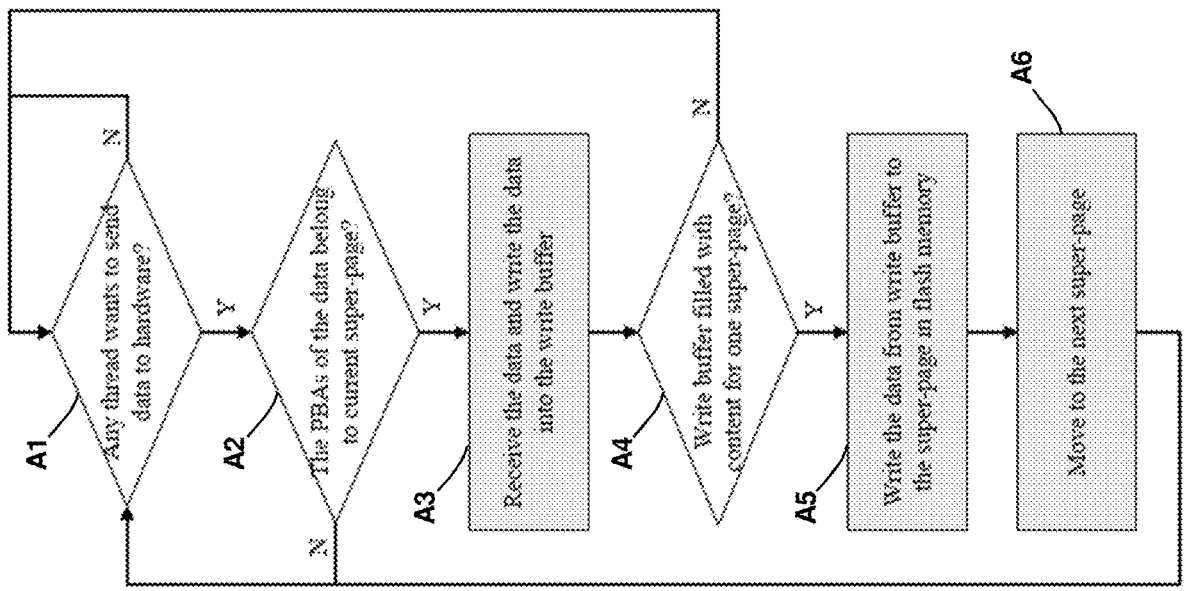
FIG. 5 illustrates the data flow when using software-based LBA-PBA binding.

Referring simultaneously to FIGS. 4 and 5 (described with reference to FIGS. 1-3), when a solid-state data storage device 100 receives data write requests, it needs to bind the LBA 20 of each to-be-written data sector (also referred to herein as data) with one PBA 18, which is called LBA-PBA binding. During runtime, the solid-state data storage device 100 always maintains a single PBA queue that contains contiguous PBAs 18 associated with one or multiple contiguous super-pages 14. Meanwhile, assume the solid-state data storage device 100 employs t threads 24 to handle write requests from a host computing device, where each thread 24 maintains its own write request queue. To this extent, there are a total of t write request queues (i.e., t LBA queues 22). Note that the values of the LBAs 20 in each LBA queue 22 are not necessarily contiguous.

To realize the LBA-PBA binding between the LBAs 20 from the t LBA queues 22 and the PBAs 18 from the single PBA queue, current practice employs a purely software-based solution, i.e., the LBA-PBA binding is determined solely by software (e.g., flash translation layer (FTL)) in the storage device controller 28 (hereafter referred to as controller 28) of the solid-state data storage device 100. For example, assume the solid-state data storage device 100 employs four threads 24 to handle write requests (i.e., t=4), hence there are four LBA queues 22. Further assume that each super-page 14 contains sixteen PBAs 18. In this case, four contiguous PBAs 18 are distributed to one LBA queue 22, i.e., among the total of sixteen contiguous PBAs 18 in one super-page 14, four contiguous PBAs 18 bind with four LBAs 20 from each LBA queue 22.

As illustrated in FIGS. 4 and 5, after the software-based LBA-PBA binding is handled by software in the controller 28 of the solid-state data storage device 100, the four threads 24 send the data 30 with the LBA-PBA binding information 32 to the device controller hardware 34 of the controller 28 that accumulates the data 30 in a write buffer 36 and physically writes the data 30 from the write buffer 36 to NAND flash memory 38, one super-page 14 at a time. Meanwhile, the flash translation layer (FTL) software updates a global LBA-PBA mapping table.

Because all of the PBAs 18 in a super-page 14 are already fixed and are contiguous, the controller 28 of the solid-state data storage device 100 must accumulate the data 30 in its write buffer 36 based on the PBAs 18 assigned to the data 30 through a predetermined software-based LBA-PBA binding before subsequently writing the data 30 to the super-page 14 in flash memory 38. As a result, as illustrated in the flow diagram in FIG. 5, from all the data 30 sent by any thread 24 (Y at process A1), the controller 28 can only accept the data 30 for which the corresponding PBAs 18 belong to the current super-page 14 that is next to-be-written (Y at process A2). At process A3, the accepted data 30 is written into the write buffer 36 by the controller 28. If the write buffer 36 is filled with enough data 30 for one super-page 14 (Y at process A4), the data 30 is written to the super-page 14 in the flash memory 38 at process A5. Flow then moves to the next super-page 14 at process A6.

The above-described process is, however, subject to inter-thread speed variation. For example, if one thread 24 for some reason fails to send the data 30 and the LBA-PBA binding information 32 to the device controller hardware 34 of the controller 28 in time, then the device controller hardware 34 has no choice but to wait for that thread 24 in order to fill the write buffer 36 based on the PBAs 18 assigned to the data 30. During the waiting time, the write bandwidth of the flash memory 38 is not utilized, leading to the under-utilization of the flash memory bandwidth and a reduction in write throughput.

Figure 6:
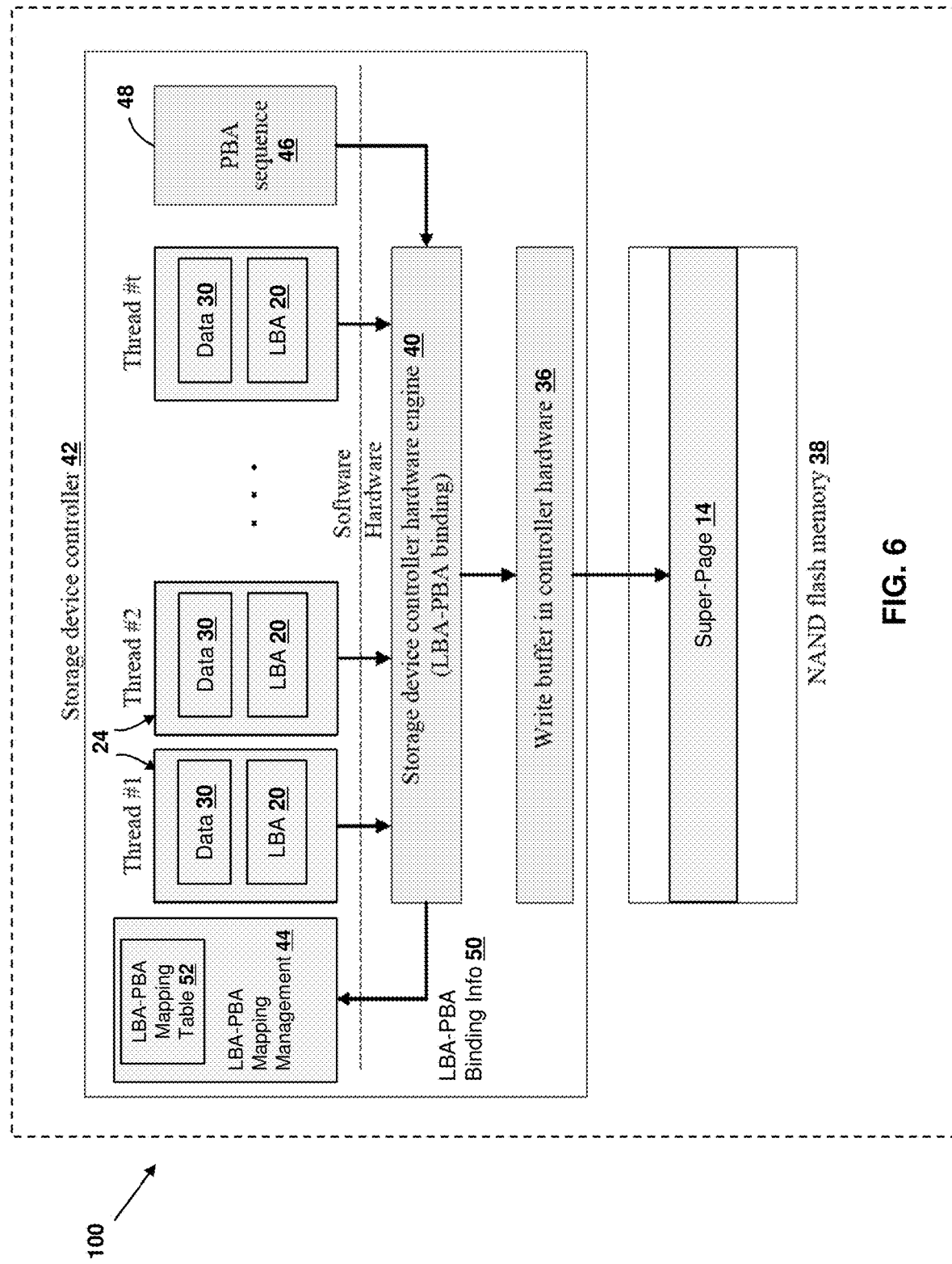
FIG. 6 illustrates a storage device controller of a solid-state data storage device using hybrid-software/hardware LBA-PBA binding according to embodiments.
Figure 7:
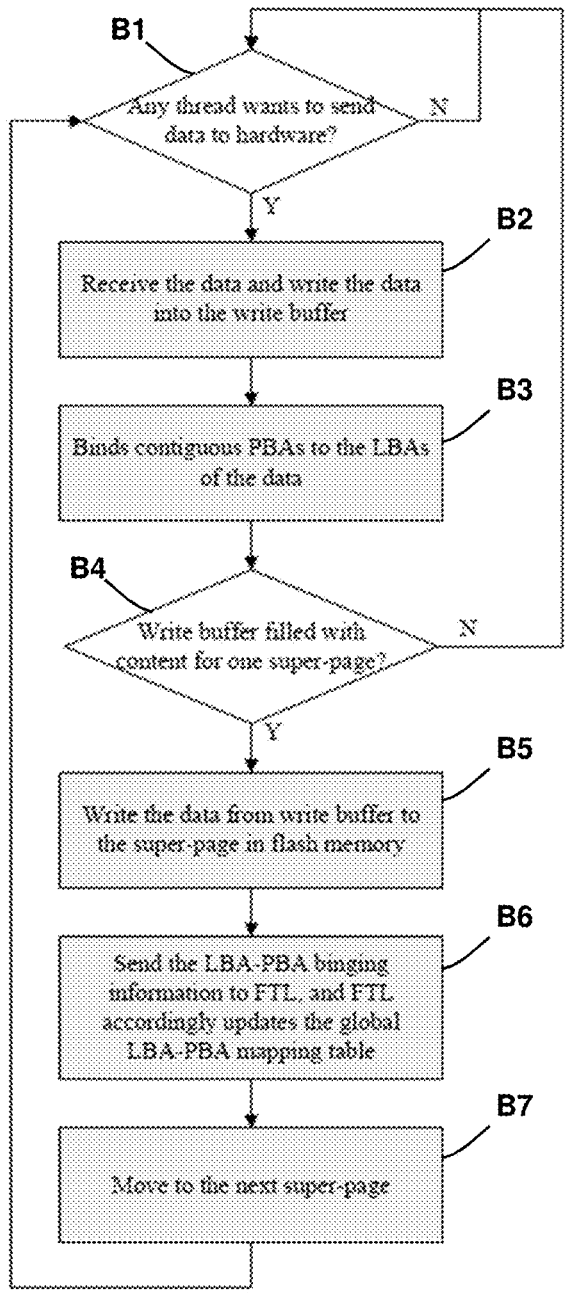
FIG. 7 illustrates a flow diagram of a process for providing hybrid-software/hardware LBA-PBA binding according to embodiments.

To solve this problem and hence avoid flash memory write bandwidth underutilization in the case of inter-thread speed variation, and as illustrated in FIGS. 6 and 7 (described with reference to FIGS. 1-3), the present disclosure provides a hybrid software/hardware based LBA-PBA binding solution. In sharp contrast to current practice, the LBA-PBA binding is finalized "on-the-fly" by a hardware engine 40 of a storage device controller 42 (hereafter referred to as controller 42) of the solid-state data storage device 100. Among all the t threads 24 that handle data write requests, each thread 24 maintains one LBA queue 22, and sends (e.g., at the same time) a number of data sectors (data 30) and their LBAs 20 to the underlying hardware engine 40 of the controller 42.

As illustrated in FIG. 6, when sending the data 30 and their LBAs 20 to the hardware engine 40 of the controller 42, each thread 24 does not yet know the LBA-PBA binding for each LBA 20 (i.e., the LBA-PBA binding has not yet occurred). Meanwhile, LBA-PBA mapping management software 44 (e.g., FTL software) of the controller 42 sends a PBA sequence 46 from a PBA queue 48 for the contiguous PBAs 18 of one super-page 14 to the hardware engine 40. Upon receiving the data 30 and their LBAs 20 from all of the t threads 24, the hardware engine 40 writes the data 30 into the write buffer 36 and binds the LBAs 20 of the data 30 with contiguous PBAs 18 in accordance with the PBA sequence 46. Once the hardware engine 40 accumulates enough data 30 for one super-page 14 in the write buffer 36, it immediately physically writes the data 30 to the super-page 14 in the flash memory 38. Meanwhile, the hardware engine 40 sends the corresponding LBA-PBA binding information 50 to the LBA-PBA mapping management software 44, which updates a global LBA-PBA mapping table 52 accordingly.

FIG. 7 illustrates a flow diagram of the hybrid software/hardware based LBA-PBA binding solution according to embodiments. For any thread 24 sending data 30 (Y at process B1), the hardware engine 40 of the controller 42 receives the data 30 and corresponding LBAs 20 from the thread 24 and writes the data 30 into the write buffer 36 at process B2. At process B3, based on the contiguous PBAs 18 in the PBA sequence 46 for the super-page 14, the hardware engine 40 binds the contiguous PBAs 18 to the LBAs 20 of the data 30 in the write buffer 36. If the write buffer 36 is filled with enough data 30 for the super-page 14 (Y at process B4), the data 30 is written to the super-page 14 in the flash memory 38 at process B5. At process B6, the LBA-PBA binding information 50 for the super-page 14 is sent to the LBA-PBA mapping management software 44, which updates a global LBA-PBA mapping table 52 accordingly. The process then moves to the next super-page 14 at process B7.

In the conventional method described above with reference to FIGS. 4 and 5, the hardware engine 34 must wait to accumulate data 30 in the write buffer 36 for a given super-page 14 based on a predetermined software-based LBA-PBA binding before subsequently writing the data 30 to that super-page 14 in flash memory 38. This may result in a reduction in the data write throughput to the flash memory 38.

In accordance with embodiments of the present disclosure, however, the hardware engine 40 receives data 30 and the LBAs 20 for the data 30 from one or more threads 24, stores the data 30 in the write buffer 36, and determines an LBA-PBA binding for the received data 30 "on-the-fly" based the contiguous PBAs 18 in the PBA sequence 46 for a super-page 14. Once enough data 30 for the super-page 14 has been written to the write buffer 36, the hardware engine 40 writes the data 30 to the super-page 14 in the flash memory 38 in accordance with the LBA-PBA binding.

It is understood that aspects of the present disclosure may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The invention claimed is:

1. A method for providing logical block address (LBA) to physical block address (PBA) binding in a storage device, the storage device including a device controller and memory, comprising:
    receiving at least one thread at a hardware engine of the device controller of the storage device, each thread including data and LBAs for the data;
    writing the data into a write buffer of the storage device;
    binding, by the hardware engine of the device controller, a sequence of contiguous PBAs for a section of the memory to the LBAs for the data in the write buffer;
    determining if the write buffer contains enough data for the section of the memory; and
    if the write buffer contains enough data for the section of the memory, writing the data from the write buffer to the section of the memory.

2. The method according to claim 1, wherein the storage device is a solid-state data storage device including flash memory, and wherein the section of the memory comprises a super-page.

3. The method according to claim 1, further including writing additional data to the write buffer if the write buffer does not contain enough data for the section of the memory.

4. The method according to claim 1, further including sending binding information for the binding to LBA-PBA mapping management software of the device controller.

5. The method according to claim 4, further comprising updating an LBA-PBA mapping table based on the binding information.

6. The method according to claim 4, wherein the hardware engine of the device controller receives the sequence of contiguous PBAs from the LBA-PBA mapping management software.

7. A storage device, comprising:
    memory;
    a write buffer; and
    a device controller, the device controller including a hardware engine, wherein the hardware engine of the device controller is configured to:
        receive at least one thread, each thread including data and logical block addresses (LBAs) for the data;
        write the data into the write buffer of the storage device;
        bind a sequence of contiguous physical block addresses (PBAs) for a section of the memory to the LBAs for the data in the write buffer;
        determine if the write buffer contains enough data for the section of the memory; and
        if the write buffer contains enough data for the section of the memory, write the data from the write buffer to the section of the memory.

8. The storage device according to claim 7, wherein the storage device is a solid-state data storage device including flash memory, and wherein the section of the memory comprises a super-page.

9. The storage device according to claim 8, wherein the flash memory comprises NAND flash memory.

10. The storage device according to claim 7, wherein the hardware engine of the device controller is further configured to write additional data to the write buffer if the write buffer does not contain enough data for the section of the memory.

11. The storage device according to claim 7, wherein the hardware engine of the device controller further configured to send binding information for the binding to LBA-PBA mapping management software of the device controller.

12. The storage device according to claim 11, wherein the LBA-PBA mapping management software is configured to update an LBA-PBA mapping table based on the binding information.

13. The storage device according to claim 11, wherein the hardware engine of the device controller receives the sequence of contiguous PBAs from the LBA-PBA mapping management software.

14. A method for binding logical block addresses (LBAs) to physical block addresses (PBAs) in a storage device, comprising:
    receiving at least one thread at a device controller hardware engine of the storage device, each thread including data and LBAs for the data;
    writing the data into a write buffer of the storage device;
    binding, by the device controller hardware engine, a sequence of contiguous PBAs for a section of the memory to the LBAs for the data in the write buffer;
    determining if the write buffer contains enough data for the section of the memory; and
    if the write buffer contains enough data for the section of the memory, writing the data from the write buffer to the section of the memory.

15. The method according to claim 14, wherein the storage device is a solid-state data storage device including flash memory, and wherein the section of the memory comprises a super-page.

16. The method according to claim 14, further including writing additional data to the write buffer if the write buffer does not contain enough data for the section of the memory.

17. The method according to claim 14, further including sending binding information for the binding to LBA-PBA mapping management software of the storage device.

18. The method according to claim 17, further comprising updating an LBA-PBA mapping table based on the binding information.

19. The method according to claim 17, wherein the hardware engine receives the sequence of contiguous PBAs from the LBA-PBA mapping management software.

* * * * *